US012767388B2

(12) United States Patent
Steele

(10) Patent No.: US 12,767,388 B2
(45) Date of Patent: Oct. 20, 2026

(54) PACKAGE HAVING A LAP OR FIN SEAL GAP ELIMINATION FEATURE

(71) Applicant: Mark Steele, New Prague, MN (US)

(72) Inventor: Mark Steele, New Prague, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 124 days.

(21) Appl. No.: 18/737,370

(22) Filed: Jun. 7, 2024

(65) Prior Publication Data

US 2024/0327070 A1 Oct. 3, 2024

Related U.S. Application Data

(63) Continuation of application No. 17/586,098, filed on Jan. 27, 2022, now Pat. No. 12,030,696, which is a (Continued)

(51) Int. Cl.

| | |
|---|---|
| ***B65D 33/25*** | (2006.01) |
| ***B29C 65/00*** | (2006.01) |
| ***B29C 65/02*** | (2006.01) |
| ***B29C 65/48*** | (2006.01) |
| ***B29L 5/00*** | (2006.01) |
| ***B29L 31/00*** | (2006.01) |
| ***B31B 70/60*** | (2017.01) |
| ***B31B 70/81*** | (2017.01) |

(Continued)

(52) U.S. Cl.

CPC .......... *B65D 33/2508* (2013.01); *B31B 70/61* (2017.08); *B31B 70/81* (2017.08); *B31B 70/8133* (2017.08); *B29C 65/02* (2013.01); *B29C 65/48* (2013.01); *B29C 66/133* (2013.01); *B29C 66/4322* (2013.01); *B29C 66/71* (2013.01); *B29C 66/72321* (2013.01); *B29C 66/8511* (2013.01); *B29L 2005/00* (2013.01); *B29L 2031/7128* (2013.01); *B31B 2150/10* (2017.08); *B31B 2160/10* (2017.08)

(58) Field of Classification Search

CPC ..... B65D 33/2508; B31B 70/61; B31B 70/81; B31B 70/8133; B29C 66/133; B29C 66/4322; B29C 66/71; B29C 66/72321; B29C 66/8511

See application file for complete search history.

(56) References Cited

U.S. PATENT DOCUMENTS 6,350,057 B1 * 2/2002 Forman ............. B65D 33/2558 24/585.12
6,481,183 B1 * 11/2002 Schmidt ............ B65D 33/2525 53/139.2

(Continued)

*Primary Examiner* — Derek J Battisti
(74) *Attorney, Agent, or Firm* — Carroll, Hoette & Butscher, LLC; Christopher R. Carroll

(57) ABSTRACT

A flexible package having a closure device and a lap or fin seal is provided that reduces or eliminates an air gap present at the fin or lap seal portion of packages. The package can include a film with a closure applied to the film. The flexible package can include a film having a closure device applied to the film transverse to the first and second side edges of the film, with the first side edge portion extending into the fin seal such that at least a portion of the first side edge portion eliminates an air gap between the fin or lap seal and at least one of the first and second side edge portions.

20 Claims, 12 Drawing Sheets

Related U.S. Application Data continuation of application No. 16/150,541, filed on Oct. 3, 2018, now Pat. No. 11,235,910, which is a continuation of application No. 15/121,739, filed as application No. PCT/US2015/017606 on Feb. 25, 2015, now Pat. No. 10,093,457.

(60) Provisional application No. 61/944,195, filed on Feb. 25, 2014.

(51) Int. Cl.
*B31B 150/10* (2017.01)
*B31B 160/10* (2017.01)

(56) References Cited

U.S. PATENT DOCUMENTS

| | | | | |
|---|---|---|---|---|
| 11,053,042 | B2 | 7/2021 | Plourde | |
| 11,350,802 | B2 * | 6/2022 | Steele | B65D 33/2533 |
| 2006/0177156 | A1 * | 8/2006 | Owen | B65D 33/2508 383/203 |
| 2007/0258665 | A1 * | 11/2007 | Greco | B65D 31/10 383/120 |
| 2010/0226600 | A1 * | 9/2010 | Steele | B65D 75/5866 383/120 |
| 2011/0266336 | A1 * | 11/2011 | Plourde | B65D 33/25 229/247 |
| 2018/0327128 | A1 * | 11/2018 | Plourde | B31B 70/8133 |

* cited by examiner

SECTION A-A

SECTION A-A

SECTION A-A

PACKAGE HAVING A LAP OR FIN SEAL GAP ELIMINATION FEATURE

CROSS-REFERENCE TO RELATED APPLICATIONS

This application is a continuation of U.S. patent application Ser. No. 17/586,098 (filed 27 Jan. 2022), which is a continuation of U.S. patent application Ser. No. 16/150,541 (filed 3 Oct. 2018, now U.S. Pat. No. 11,235,910), which is a continuation of U.S. patent application Ser. No. 15/121,739 (filed 25 Aug. 2016, now U.S. Pat. No. 10,093,457), which is a section 371 application or national stage entry of International Patent Application No. PCT/US15/17606 (filed 25 Feb. 2015), which claims priority to and the benefit of U.S. Provisional Application No. 61/944,195 (filed 25 Feb. 2014). The entire disclosures of each of the above-referenced applications are fully incorporated herein by reference.

BACKGROUND

Technical Field

The present invention relates generally to flexible packaging and, more particularly, to packages, and methods for forming and using packages, having a lap or fin seal.

State of Art

Flexible packages are used for containing a wide variety of items, both solid and liquid, such as beverages, lawn products and food products. More and more packages, including flexible packages, are being used for the containment and/or dispensing of food, liquids or medical products.

There are major flaws with the current methods of using a single locking member strip of zipper—e.g., Velcro®, press-to-close, or the like—sealed to a web of material in the transverse direction when it is folded over and locked onto itself during package formation. When the closure is attached across the web of material, it is held back from the edges of the material for the section of material where the package lap seal or fin seal will be formed when the package is made. The profile of the zipper, if running both ends into the fin or lap seal, is too thick and will leave gaps in the fin or lap seal where air or product can get in and out of the package.

Referring to FIGS. 1-4, a conventional package 10 utilizing convention closure devices 12 and methods (e.g., zipper, Velcro®, press-to-close, etc.) is shown. The closure device 12 is sealed to the web of material 11 in the transverse direction to the web and folded over and locked onto itself when the package 10 is formed. Those closure devices 12 provided as zipper devices can include front 13 and rear 15 interlockable members and one or more flange portions adapted to seal or otherwise attach to the package.

When the closure 12 is attached across the web of material, it is typically held back or otherwise provide a distance short of the edges 16, 18 of the material for the section of material where the package lap seal or fin seal 20 will be formed when the package 10 is made. The profile of the zipper closure 12, if running both ends into the fin or lap seal 20, is too thick and will leave gaps AG in the fin or lap seal where air or product can get in and out of the package 10.

Moreover, the method of forming a pillow or side gusseted package is not exact, and leaving the exact amount of space on the ends of the closure to form the correct size fin or lap seal is virtually impossible. Typically, the zipper is actually run a little short so as to make sure none gets in the fin seal 20 and is only as close to the fin seal as reasonably possible (e.g., adjacent or approaching the seal). This process actually leaves a gap AG between the ends of the closure when the package is formed (FIG. 4), where air and small particles of the product that are in the package can pass through. This is not acceptable to many companies, or consumers, as they require a package that is as close to air tight as possible.

BRIEF SUMMARY

The present invention addresses certain problems facing flexible packages and the packaging industry. Embodiments of the present invention are directed to a flexible package having zipper, package and/or closure features, constructs, structures and forming methods to reduce or even eliminate the air gap that can be present at the fin or lap seal area of a traditional package.

A flexible package having a closure device and a lap or fin seal is provided that reduces or eliminates an air gap present at the fin or lap seal portion of conventional packages. The package in certain embodiments can include a film with a closure applied to the film. A bridge material is provided to the film to fill the air gap when the closure is in a sealed condition. The flexible package in certain alternative embodiments can include a film having a closure device applied to the film transverse to the first and second side edges of the film, with the first side edge portion extending into the fin seal such that at least a portion of the first side edge portion to eliminate an air gap between the fin seal and at least one of the first and second side edge portions.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figures 1, 2, 3, 4:
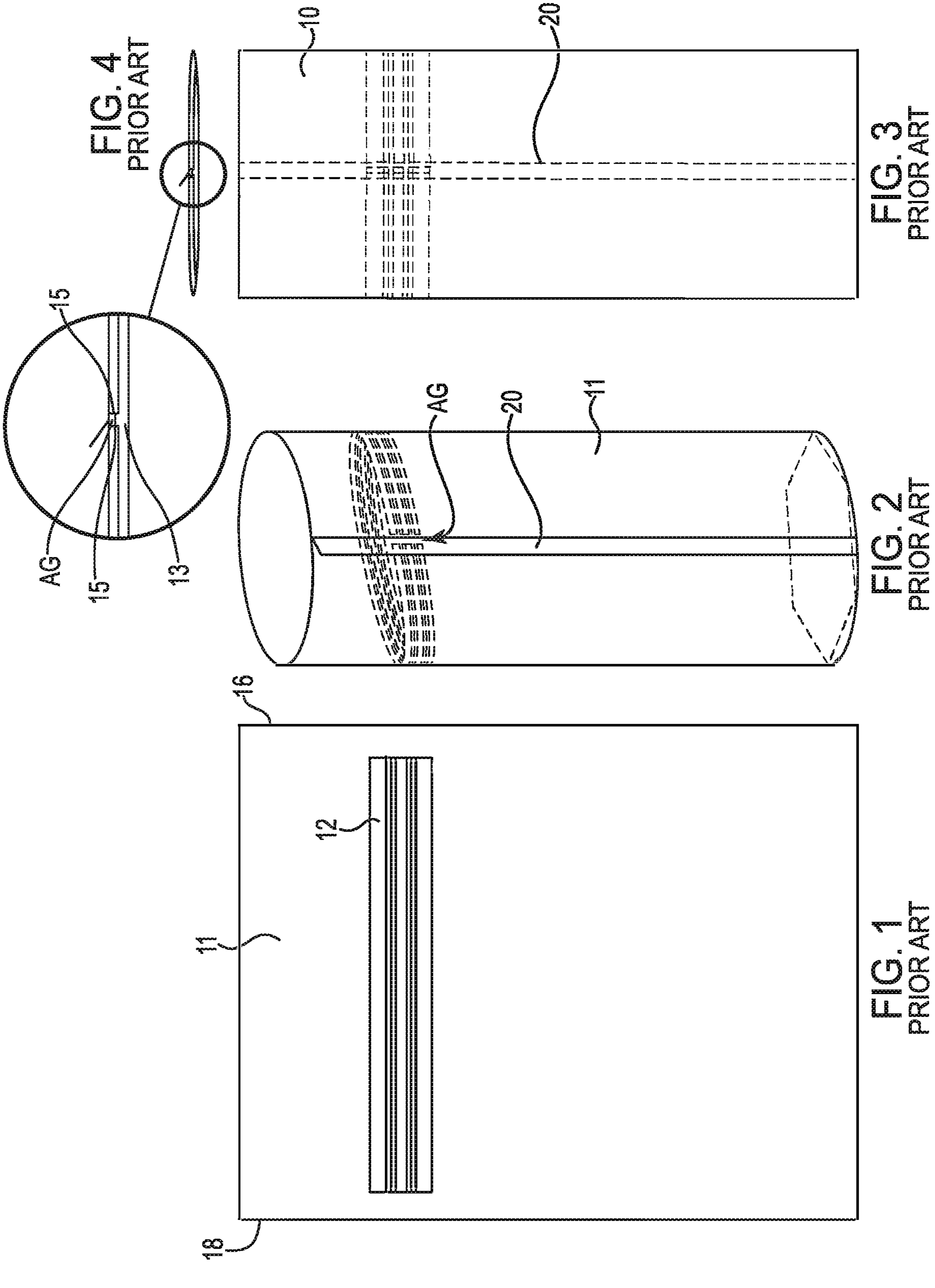
FIG. 4 PRIOR ART
FIG. 3 PRIOR ART
FIG. 2 PRIOR ART
FIG. 1 PRIOR ART
FIG. 1 is a plan view of a web or film material with a locking member applied thereto according to conventional methods.
FIG. 2 is a perspective view of the web of material after the ends are brought together to form a fin seal according to conventional methods.
FIG. 3 is a front view of a formed package according to conventional methods using the film of FIG. 1.
FIG. 4 and corresponding detail A are top views of a portion of the partial package of FIG. 3.
Figure 5:
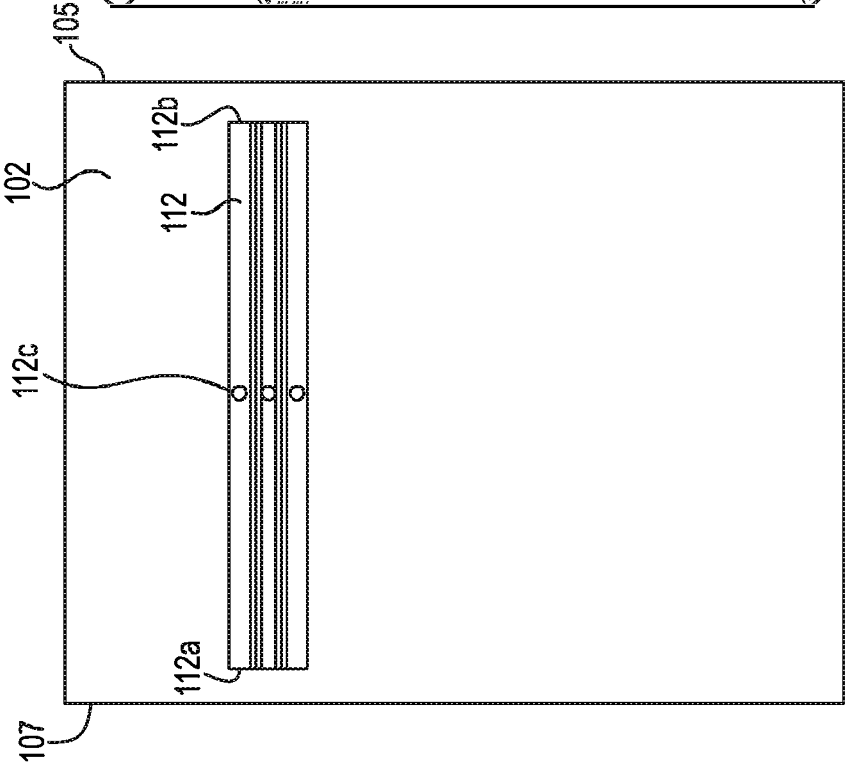
FIG. 5 is a plan view of a film or web material with a locking member applied thereto according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims. For illustrative purposes, cross-hatching, dashing or shading in the figures is provided to demonstrate sealed portions and/or integrated regions or devices for the package.

DETAILED DESCRIPTION

In the following descriptions, the present invention will be explained with reference to example embodiments thereof. However, these embodiments are not intended to limit the present invention to any specific example, embodiment, environment, applications or particular implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

References to “top,” “bottom,” “front,” “back” and the like are for illustrative purposes only and are not meant to limit the scope of the disclosed invention. For instance, placing a closure device on the "front" panel could be just as easily employed in the back or side portions of the package.

The flexible package 100 according to certain embodiments of the present invention can comprise one or more panel or film portions, which are joined or folded to define an interior compartment accessible through an access opening. One or more of the portions of the package 100 may also be gusseted. Placing a gusset on the bottom also provides the product with the ability to stand up on its own. Other panels or film portions, such as a side panel, could be gusseted as well.

Various zipper, package and/or closure features, constructs, structures and forming methods are provided with embodiments of the package 100 of the present invention to reduce or even eliminate the air gap that can be present at the fin or lap seal portion of a traditional package Referring to FIGS. 5-8, a closure device 112 is shown on a film 102 panel in a horizontal orientation. The closure 112 has first and second ends 112*a*, 112*b*. Bridging material 112*c* is provided at the midpoint of the length of the closure between ends 112*a* and 112*b*. The material 112*c* can include a drop of hot melt or rubbery (or other polymer or like material) glue-like material to serve as caulking. Other formable or shapable materials are also envisioned for use with the present invention.

Figure 6:
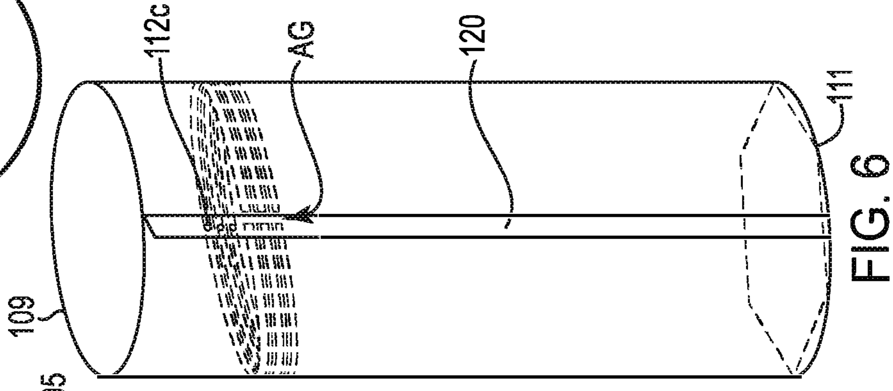
FIG. 6 is a perspective view of the web of material after the ends are brought together to form a fin seal according to certain embodiments of the invention.

The package 100 is formed as shown in FIG. 6 by bringing first and second ends 105, 107 of film 102 together around a fill tube around a vertical axis to form a fin seal 120 along the entire height of the film from top 109 to bottom 111. The closure device 112 faces inwards within the package. The air gap AG can be seen adjacent where the fin seal is formed due to the ends of the closure 112*a* and 112*b* not completely contacting one another. It can also be seen that the bridging material 112*c* is located opposite the air gap.

Figure 7:
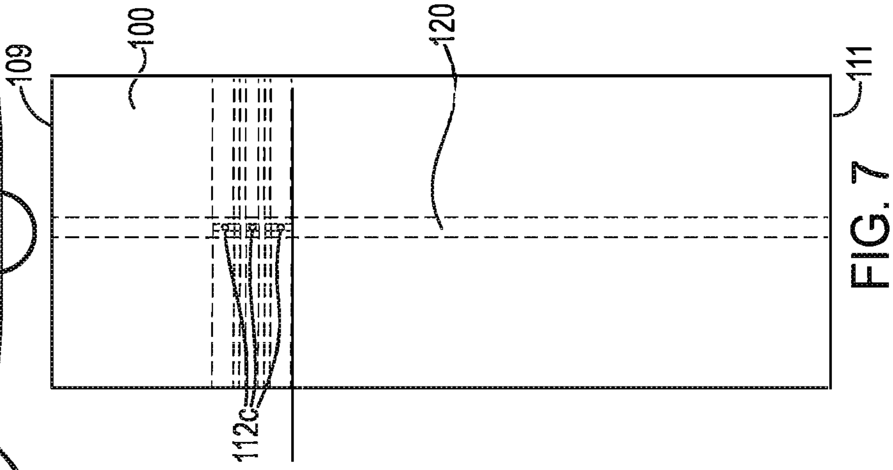
FIG. 7 is a front view of a formed package according to certain embodiments of the invention using the film of FIG. 5.
Figure 8:
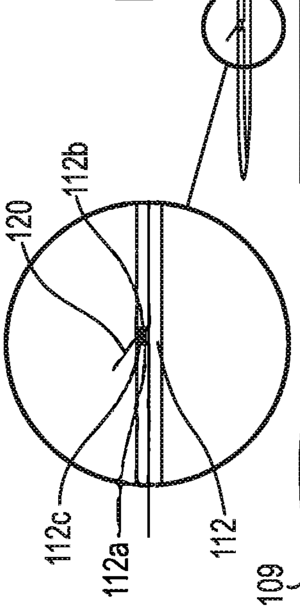
FIG. 8 and corresponding detail A are top views of a portion of the partial package of FIG. 6.
Figure 12:
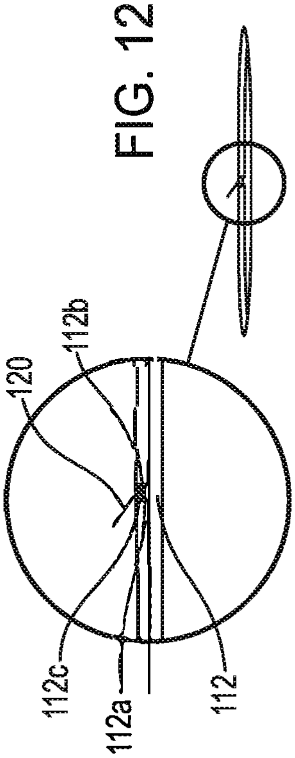
FIG. 12 and corresponding detail A are top views of a portion of the partial package of FIG. 10.
Figure 11:
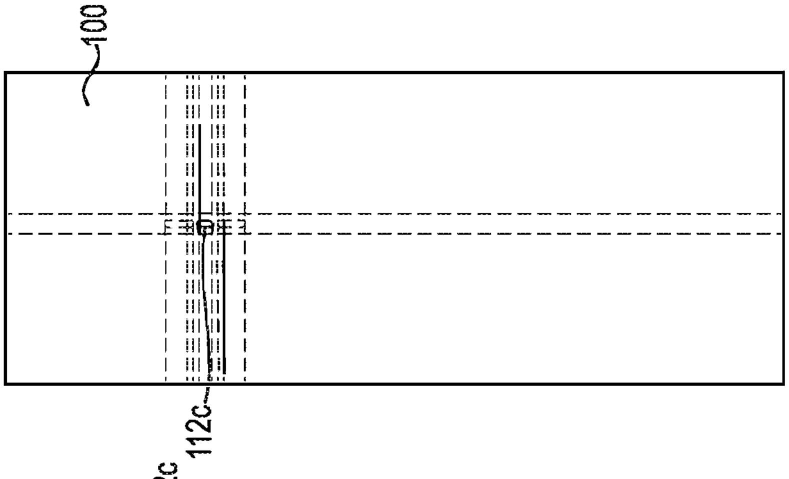
FIG. 11 is a front view of a formed package according to certain embodiments of the invention using the film of FIG. 9.
Figure 10:
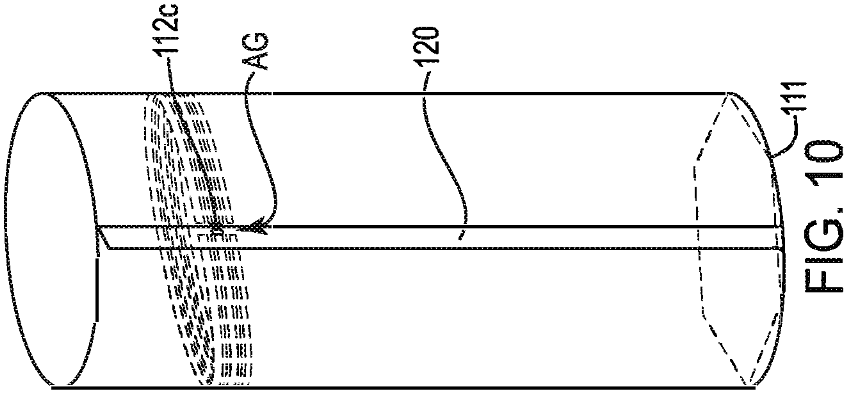
FIG. 10 is a perspective view of the web of material after the ends are brought together to form a fin seal according to certain embodiments of the invention.
Figure 9:
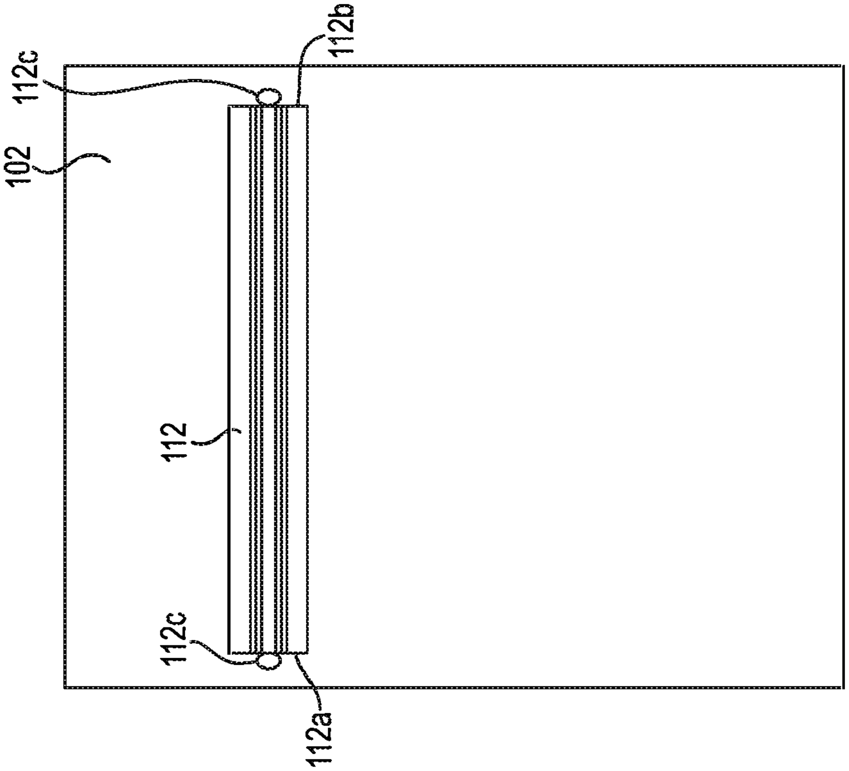
FIG. 9 is a plan view of a film or web material with a locking member applied thereto according to certain embodiments of the invention.

The corresponding formed package 100 is shown in FIGS. 7 and 8. The package 100 is sealed by pressing the back portion of the closure 112 into the front portion of the closure 112. In doing so, the bridging material 112*c* is disposed in and fills the air gap AG.

Further embodiments can include adding separate bridging material 112*c* to the device or package 100 to fill in or bridge the gap AG and prevent leaking.

Referring to FIGS. 9-12, the bridging material 112*c* is now located just outside of the ends 112*a* and 112*b* of the closure 112. When the ends 105, 107 of the film 102 are bought together, the bridging material 112*c* fills the air gap AG. The package is closed by joining the back side portion of the closure to the front side. The back side abuts against the filled air gap.

Figure 13:
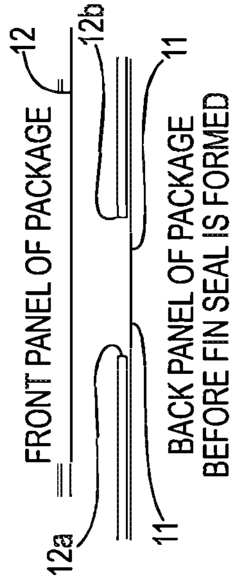
FIGS. 13-16 are detail views of a portion of a conventional package demonstrating the presence of an air gap.
Figure 14:
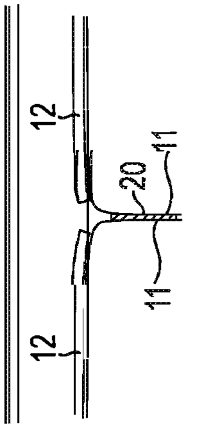
Figure 15:
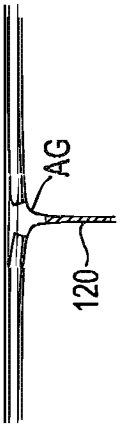
Figure 16:
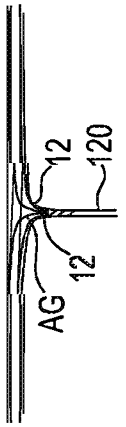

Referring to FIGS. 13-16, a series of conventional steps of forming a fin seal are shown to illustrate presence of an air gap. In FIG. 13, the ends of the package are shown just before forming the fin seal. The fin seal 20 is shown in FIG. 14. Then the rear portion of the seal is closed against the front portion in FIG. 15 (locking members engaged), which leaves an air gap AG adjacent the fin seal. As shown in FIG. 16, the air gap cannot be eliminated even if the closure is run into the fin seal.

Figure 17:
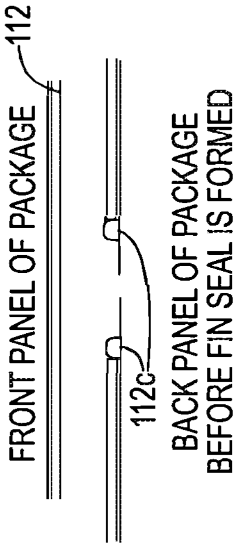
FIGS. 17-19 are detail views of a portion of a package according to certain embodiments of the invention demonstrating the elimination of the air gap.
Figure 18:
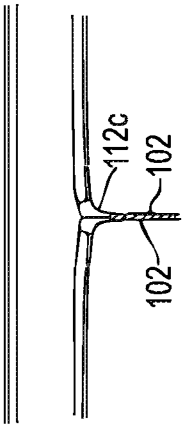
Figure 19:
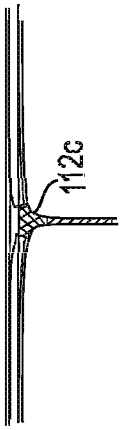

Now in contrast, FIGS. 17-19 illustrate the elimination of an air gap by employing a bridging material 112*c* as discussed in the preceding embodiments. The bridging material 112*c*, which may be a bead of silicone or caulk, or other similar material as discussed above, is compressed together (FIG. 18) to fill in the air gap region when the rear seal portion is joined to the front portion as shown in FIG. 19.

Figure 26:
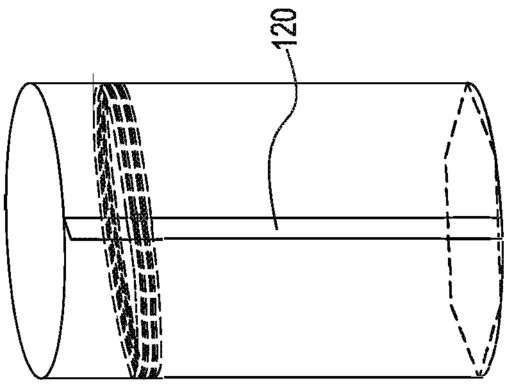
FIG. 26 is a perspective view of a partially formed package using the closure of FIG. 24 according to certain embodiments of the invention.
Figure 27:
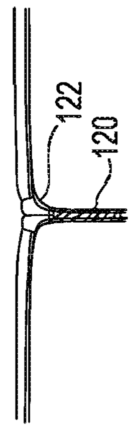
FIGS. 27 and 28 are detail views of a portion of a package using the closure of FIG. 24 according to certain embodiments of the invention demonstrating the elimination of the air gap.
Figure 28:
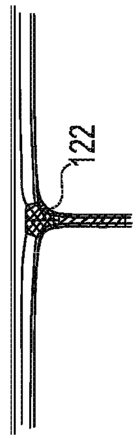
Figure 21B:
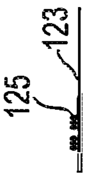
FIGS. 20, 21A and 21B are front, side and end views, respectively, of a closure member according to certain embodiments of the invention.
Figure 20:
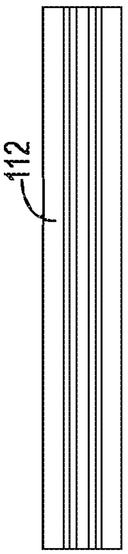
Figure 21A:
Figure 22:
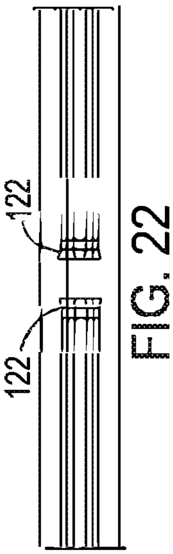
FIGS. 22, 23 and 24 are front, side and front views, respectively, of a closure member formed according to certain embodiments of the invention.
Figure 23:
Figure 24:
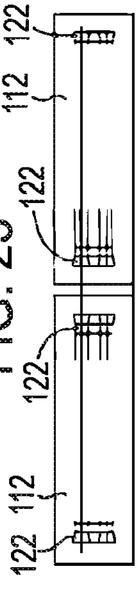
Figure 25:
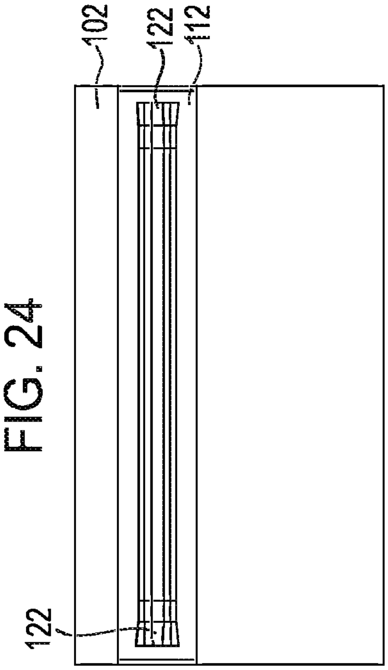
FIG. 25 is a plan view of the closure member of FIG. 24 applied to a film or web according to certain embodiments of the invention.
Figure 29:
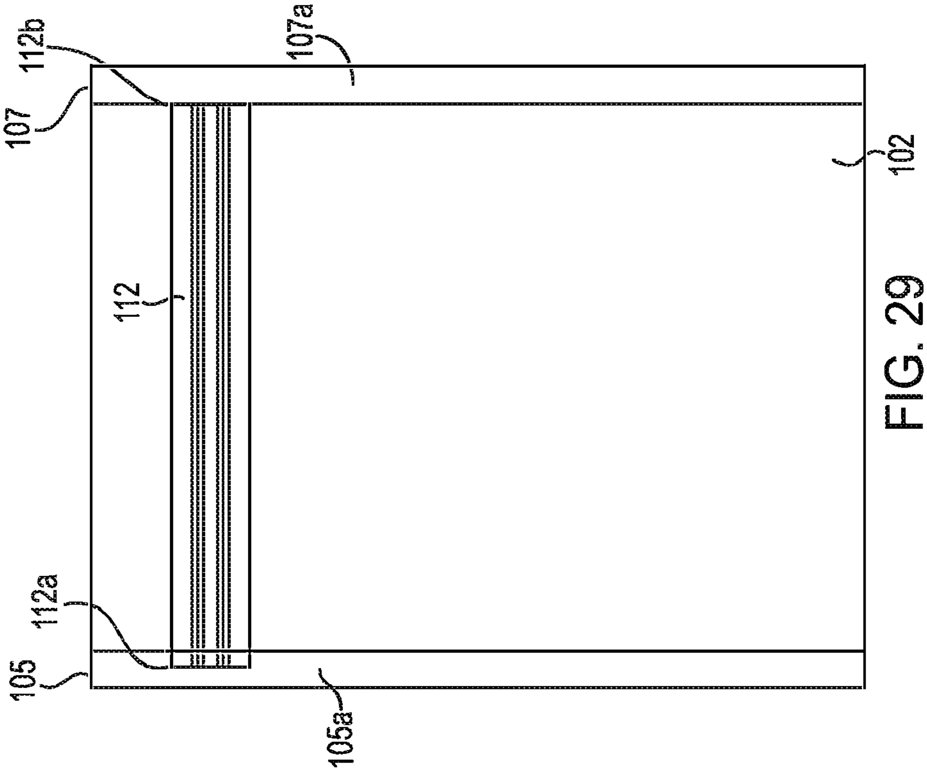
FIG. 29 is a plan view of a film or web of material with a locking member applied thereto according to certain embodiments of the invention.

Referring to FIGS. 20-28, a method of forming the bridging material from the closure 112 is illustrated. The unmodified closure 112 is shown in FIGS. 20, 21A and 21B. The closure includes a flange portion 123 and locking members 125 extending therefrom. Using heat, a forming tool, anvil and the like, a portion of the closure 112 can be melted/softened and crushed or pressured into ridges, protrusions, swells, beads or perpendicular mounds 122 adjacent one of the ends as shown in FIGS. 22-23. Then a section is cut and separated from the spool at the center of the crush region as shown in FIG. 24, thereby forming separate sections. One of the sections is attached to the film or web to be made into a package. The package is formed by creating a fin or lap seal as shown in FIG. 26. As can be seen in FIG. 27, the profile bead portions or swells 122 are compressed together as the fin seal 120 is formed. This results in the bead material 122 filling the seal/closure interface region where the air gap would otherwise exist, as is shown in FIG. 28.

Figure 30:
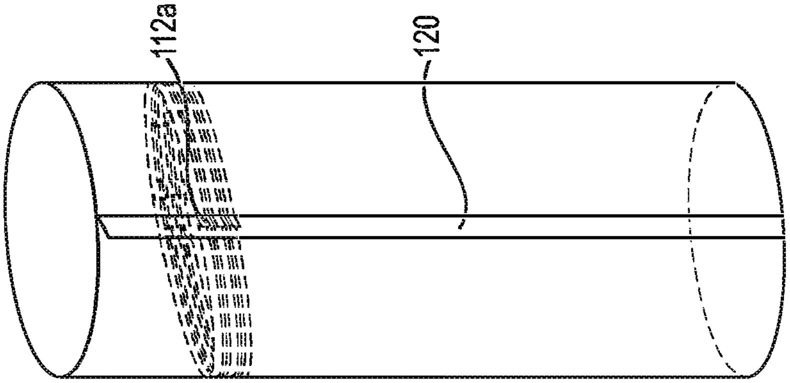
FIG. 30 is a perspective view of the web of material after the ends are brought together to form a fin seal according to certain embodiments of the invention.
Figure 31:
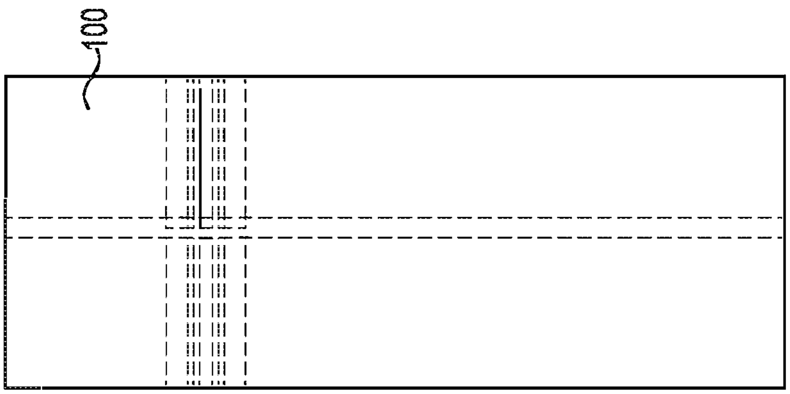
FIG. 31 is a front view of a formed package according to certain embodiments of the invention using the film of FIG. 29.
Figure 32:
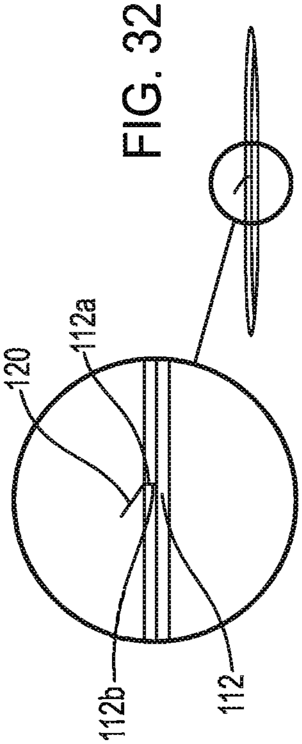
FIG. 32 and corresponding detail A are top views of a portion of the partial package of FIG. 30.

Referring now to FIGS. 29-32, another embodiment of preventing an air gap is shown. Adjacent each of the left 105 and right 107 edges is a respective edge region that will form the fin or lap seal 105*a*, 107*a*. One of the ends of the closure 112*a* extends partially into one of the fin sealing edge regions 105*a*. The opposing end 112*b* is aligned with the opposing seal region 107*a* such that it does not extend into it. In one embodiment, the extension is half-way into the sealing edge region. The end of the closure that extends into the sealing region 112*a* is sealed into the fin or lap seal 120 as shown in FIGS. 30-32. This bumps the non-extending end of the closure 112*b* up to the inside edge of the fin seal 120 and against the folded edge of the opposing end 112*a* that extends into the fin seal, thereby eliminating the air gap.

Figure 35:
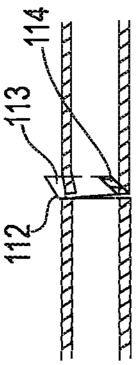
FIG. 35 is a sectional view along lines A-A of FIG. 34.
Figure 34:
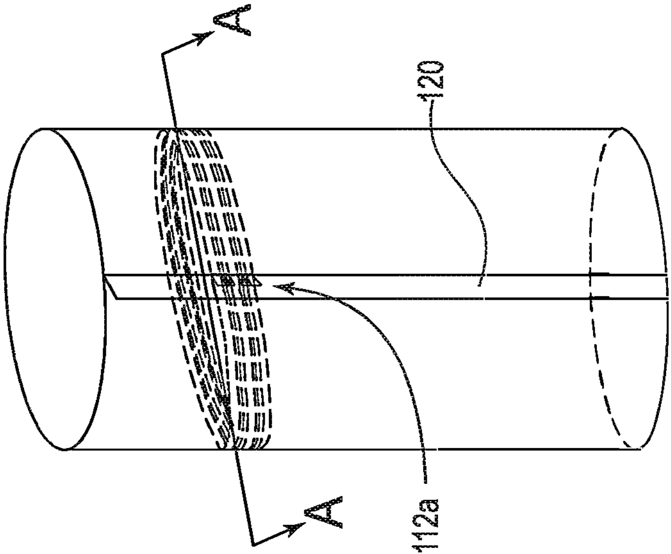
FIG. 34 is a perspective view of the web of material after the ends are brought together to form a fin seal according to certain embodiments of the invention.
Figure 33:
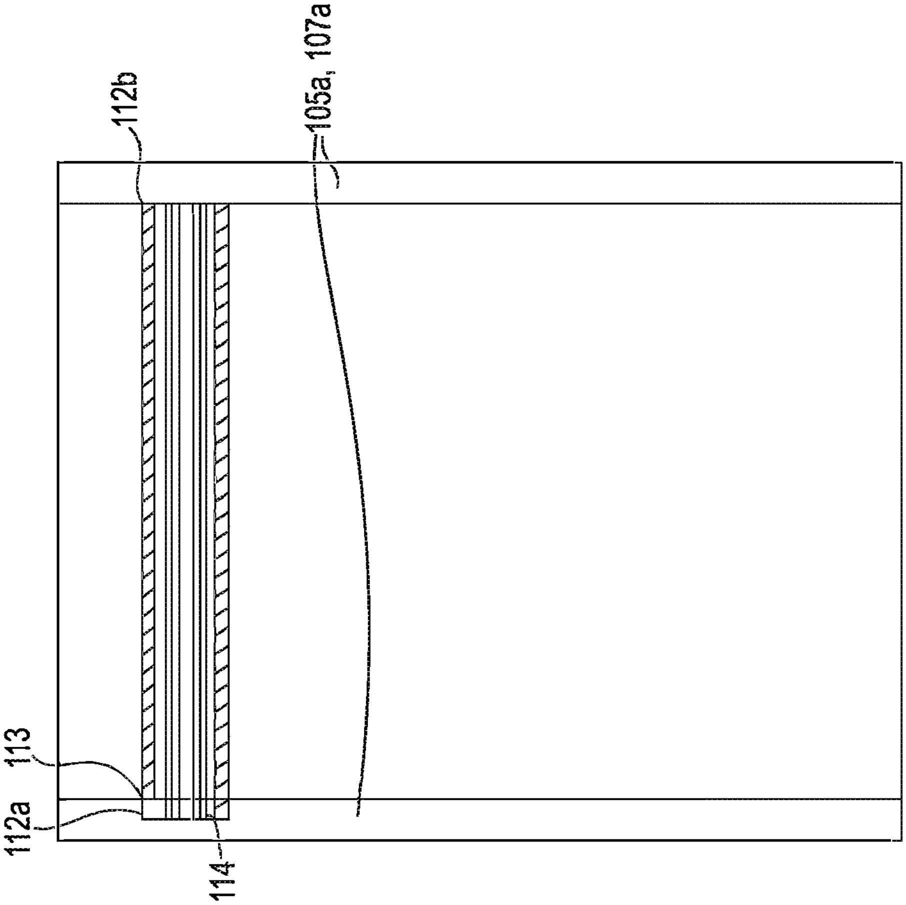
FIG. 33 is a plan view of a film or web of material with a locking member applied thereto according to certain embodiments of the invention.
Figure 39:
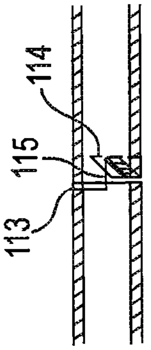
FIG. 39 is a sectional view along lines A-A of FIG. 38.
Figure 38:
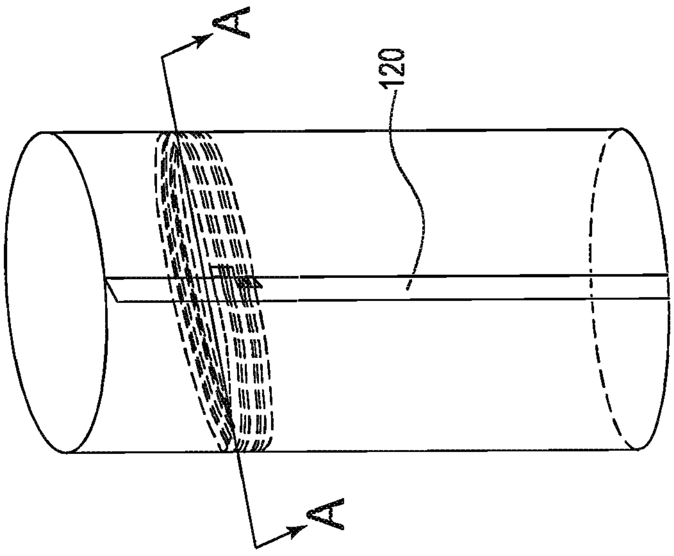
FIG. 38 is a perspective view of the web of material of FIG. 37 after the ends are brought together to form a fin seal according to certain embodiments of the invention.
Figure 36:
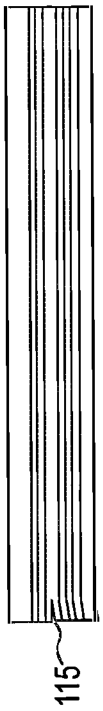
FIG. 36 is a front side view of a closure according to certain embodiments of the invention.
Figure 37:
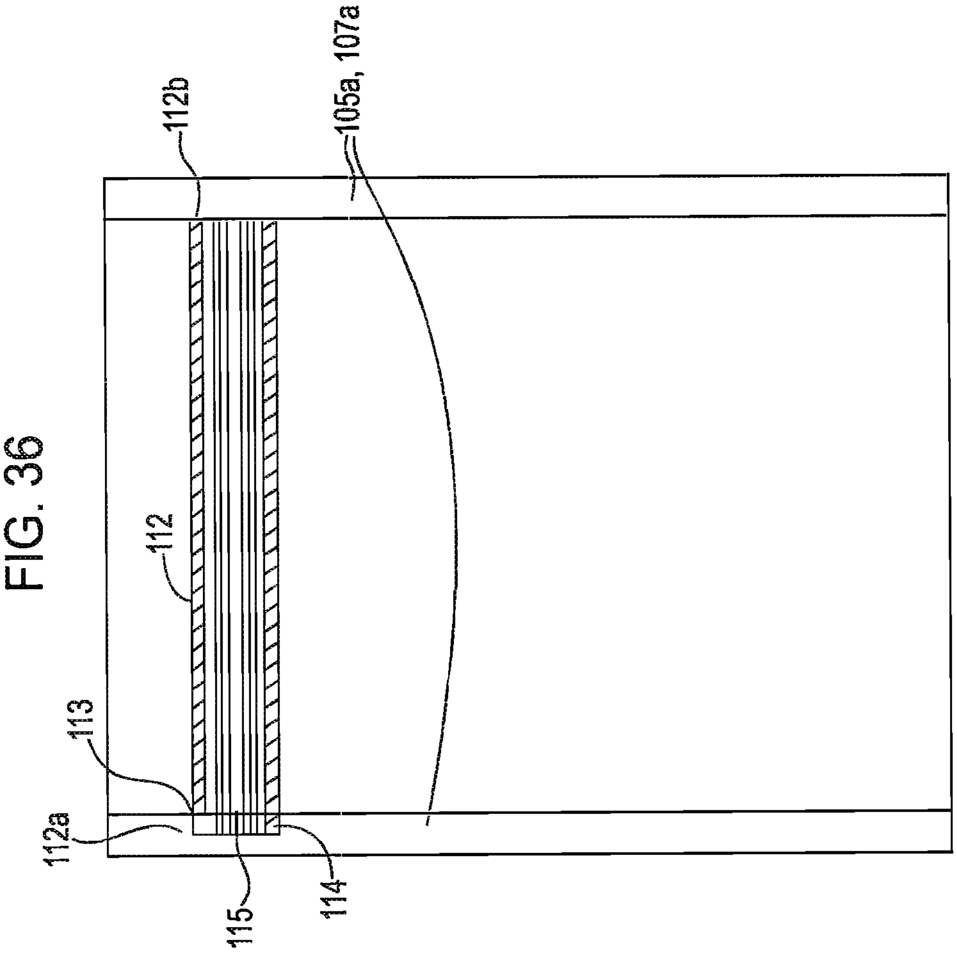
FIG. 37 is a plan view of a film or web of material with the locking member of FIG. 36 applied thereto according to certain embodiments of the invention.
Figure 40:
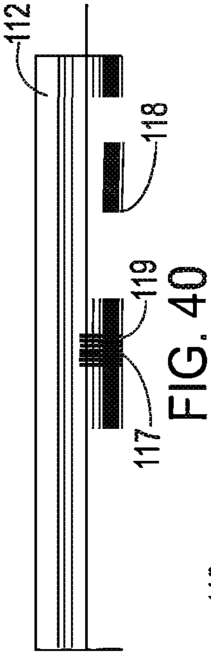
FIG. 40 is a front side view of a closure according to certain embodiments of the invention.
Figure 41:
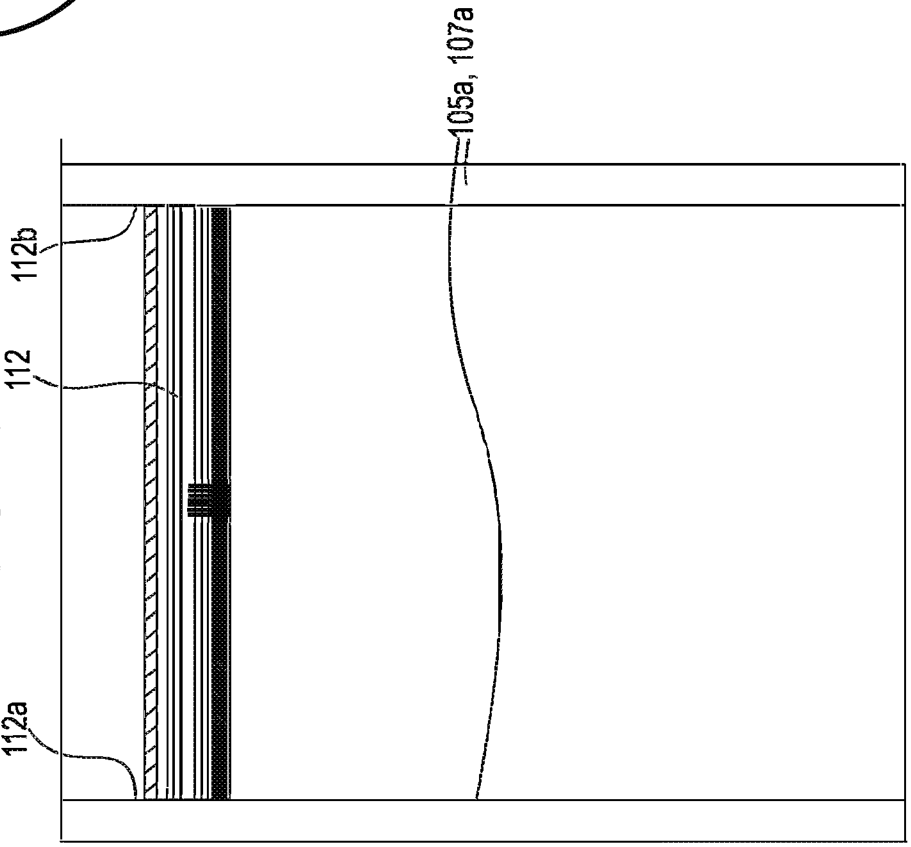
FIG. 41 is a plan view of a film or web of material with the locking member of FIG. 40 applied thereto according to certain embodiments of the invention.
Figure 42:
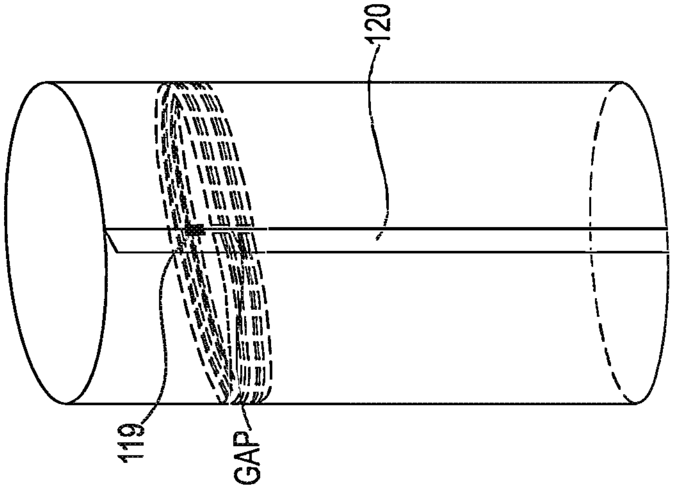
FIG. 42 is a perspective view of the web of material of FIG. 41 after the ends are brought together to form a fin seal according to certain embodiments of the invention.
Figure 43:
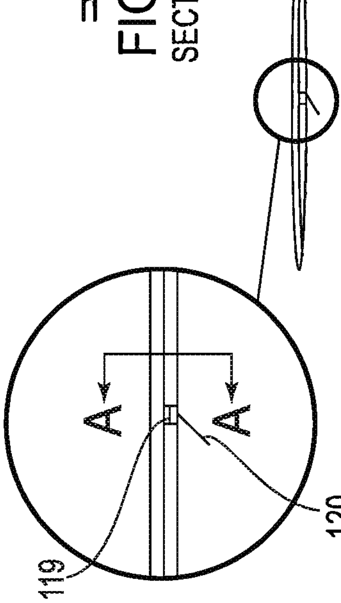
FIG. 43 is a top view of the package of FIG. 42 showing the closure engaged according to certain embodiments of the invention.
Figure 44:
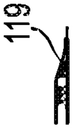
FIG. 44 is a sectional view along lines A-A of the detail view portion of FIG. 43.

Referring now to FIGS. 33-35, another embodiment of preventing an air gap is shown. The end 112*a* of the closure 112 that extends partially into one of the fin sealing edge region 105*a* has a top seal 113 that stops before the fin seal region begins. When the fin seal 120 is formed, the non-sealed top portion 113 bows outward when the bottom portion that includes its seal 114 is sealed into the fin seal 120. The bowed-out portion 113 bridges over the opposing end 112*b* of the closure and makes contact to close the air gap.

Referring now to FIGS. 36-39, the end 112*a* of the closure 112 that extends partially into one of the fin sealing edge regions 105*a* has a slit 115 horizontally extending into the extending region of the closure 112*a* at the proximate midpoint of the vertical height of the closure 112. When the fin seal 120 is formed, the lower portion below the slit 114 (which has a seal) wraps into the fin seal 120 and is adjustable into and out of the fin seal 120 as the fin seal changes size during the package forming process. The unsealed top portion of the closure 113 (which lacks a seal) bridges over to meet or overlap the opposite end 112*b* of the closure. The overlap adjusts as the fin seal 120 changes sizes during the package forming process.

Referring now to FIGS. 40-44, an alternative embodiment is shown wherein a plurality of vertically-aligned slits 117 are formed upwards from the bottom edge of the closure in the approximate mid-width region to form a plurality of hinge sections 119. The slits 117 extend approximately half way up the vertical height of the closure 112. A high energy or tacky section 118 extends horizontally adjacent the bottom edge of the closure 112. When the fin seal 120 is formed, the hinged sections 119 are pulled over and gripped by or cling to the opposing front closure region due to the presence of the high energy/tacky material. Thus, an air gap is prevented.

Figure 47:
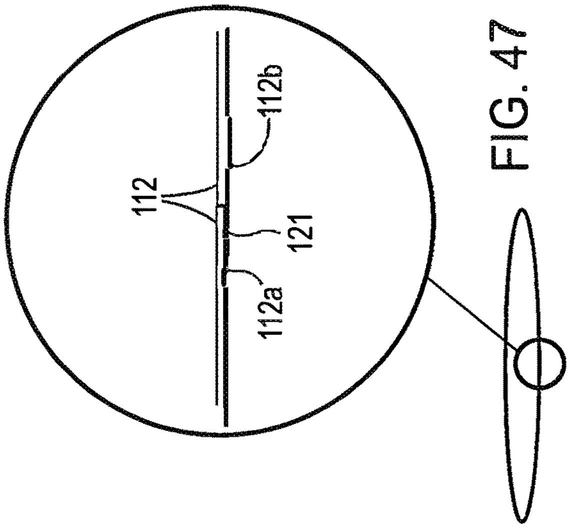
FIG. 47 is a top view of the package of FIG. 46.
Figure 46:
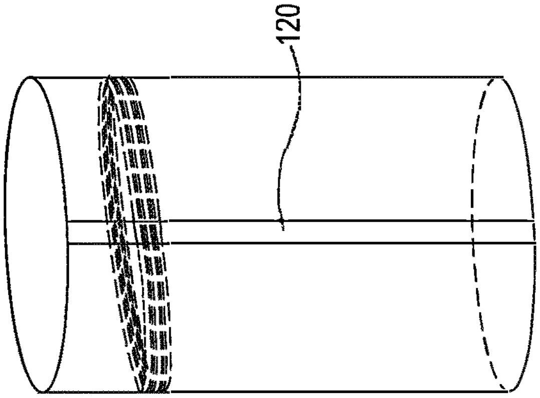
FIG. 46 is a perspective view of the web of material of FIG. 45 after the ends are brought together to form a fin seal according to certain embodiments of the invention.
Figure 45:
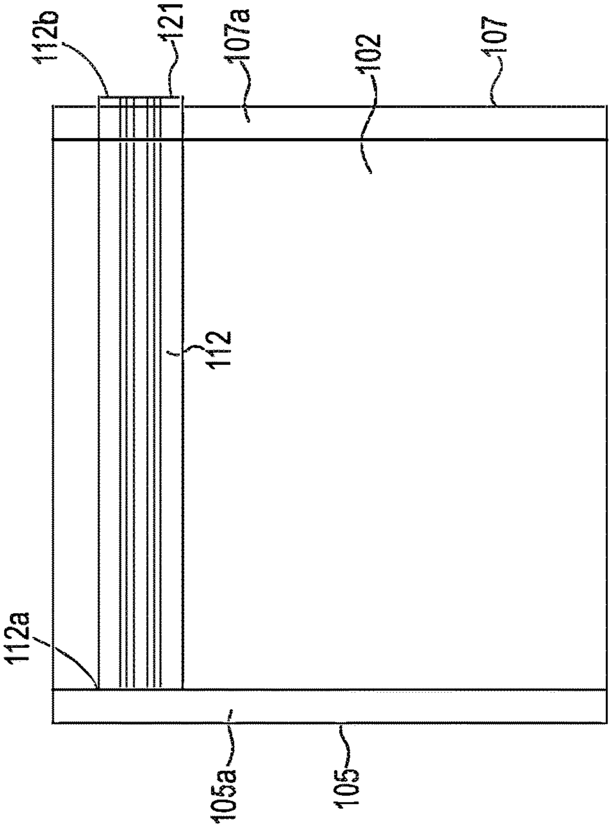
FIG. 45 is a plan view of a film or web of material with a cantilevered locking member applied thereto according to certain embodiments of the invention.
Figure 48B:
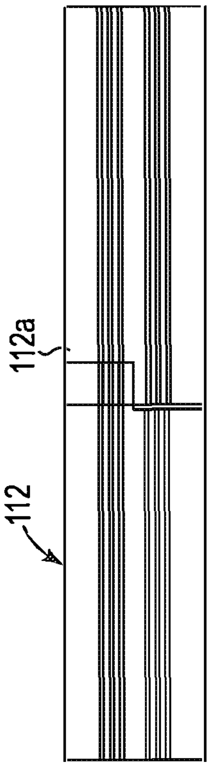
FIG. 48B is a plan view of the closure of FIG. 48A wherein the ends are joined together.
Figure 49B:
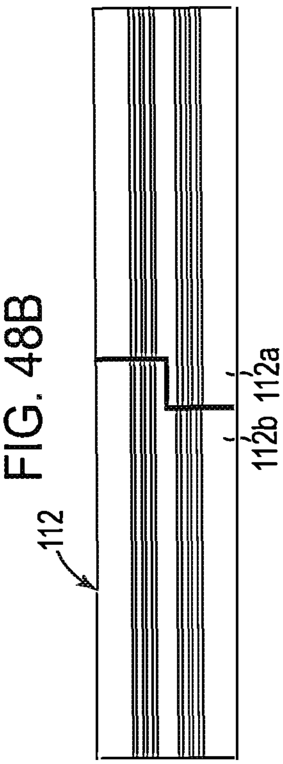
FIG. 49B is a plan view of the closure of FIG. 49A wherein the ends are joined together.
Figure 50B:
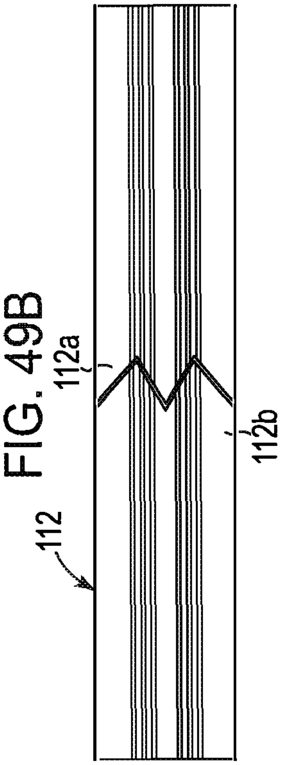
FIG. 50B is a plan view of the closure of FIG. 50A wherein the ends are joined together.

Referring next to FIGS. 45-47, one end 112*b* of the closure 112 extends past the edge 107 of the film 102 to define a cantilevered portion 121. When the fin seal is formed, the cantilevered portion 121 extends over the gap area due to its extra length overlapping the adjacent end 112*a* of the closure. Thus the gap is closed over.

Figure 51B:
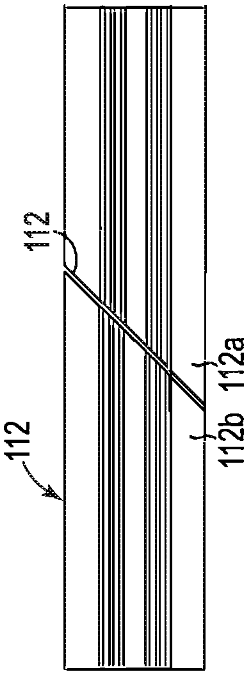
FIG. 51B is a plan view of the closure of FIG. 51A wherein the ends are joined together.
Figure 48A:
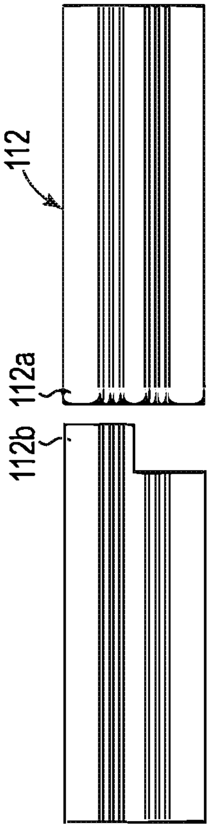
FIG. 48A is a plan view of a closure with a notched first end according to certain embodiments of the invention.

As shown in FIGS. 48A-51B, the ends 112*a*, 112*b* of the closure device 112 can be shaped or sized to facilitate overlapping, interlockability or engagement in numerous configurations. In FIG. 48A, a first end 112 a includes a notched area where the closure material has been removed from a lower half of the closure adjacent the first end. The ends overlap in such configuration as shown in FIG. 48B. In FIG. 49A, a first end 112*a* includes a notched area where the closure material has been removed from a lower half of the closure adjacent the first end. Also, the second end 112*b* has a notched portion in its upper half adjacent the second end 112*b*. The ends abut one another in such configuration as shown in FIG. 49B. In FIG. 50A, both ends 112*a* and 112*b* receive corresponding zigzag, sawtooth or ridged cuts so that they abut one another in such configuration as shown in FIG. 50B. In FIG. 51A, both ends 112*a* and 112*b* receive corresponding sloped cut so that they abut one another in such configuration as shown in FIG. 51B. Other shapes, sizes, features and constructs can be employed as well to provide interlockable end portions for the closure 112 without deviating from the spirit and scope of the present invention.

Figure 49A:
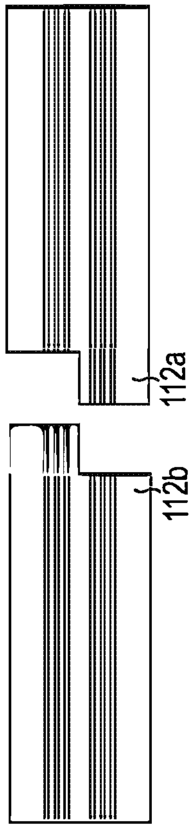
FIG. 49A is a plan view of a closure with notched ends according to certain embodiments of the invention.
Figure 50A:
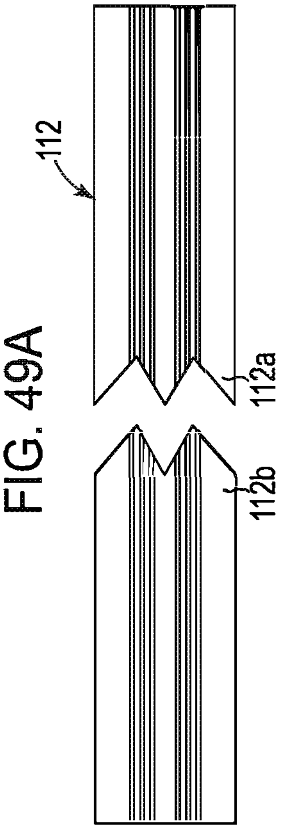
FIG. 50A is a plan view of a closure with ridged ends according to certain embodiments of the invention.
Figure 51A:
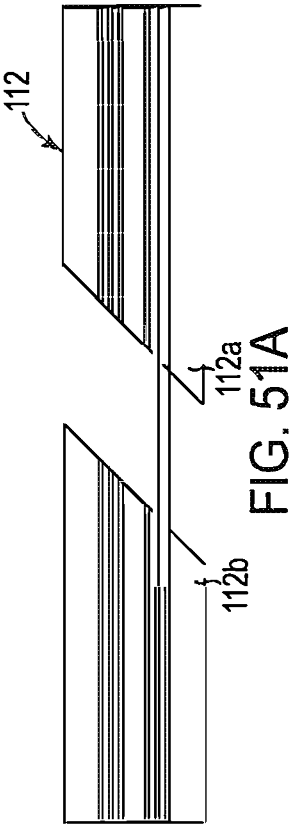
FIG. 51A is a plan view of a closure with sloped ends according to certain embodiments of the invention.
Figure 54:
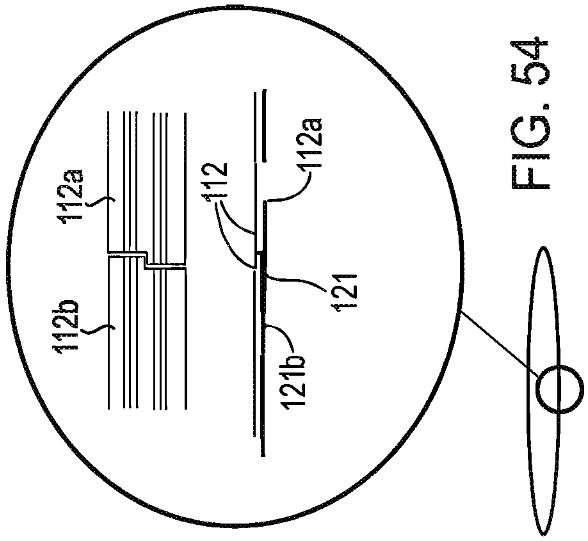
FIG. 54 is a top view of the package of FIG. 53.
Figure 53:
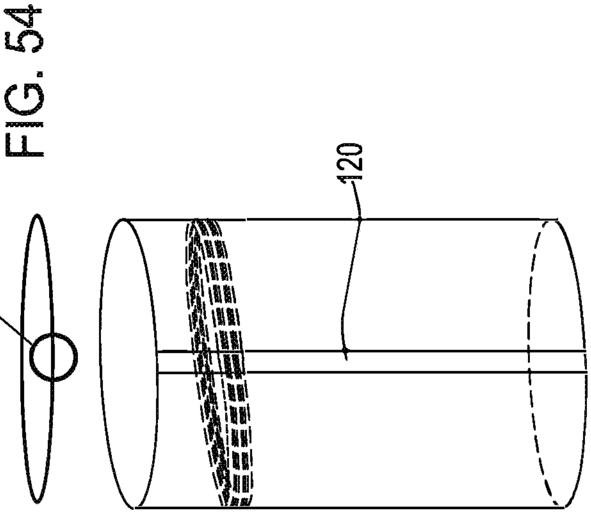
FIG. 53 is a perspective view of the web of material of FIG. 52 after the ends are brought together to form a lap seal according to certain embodiments of the invention.
Figure 52:
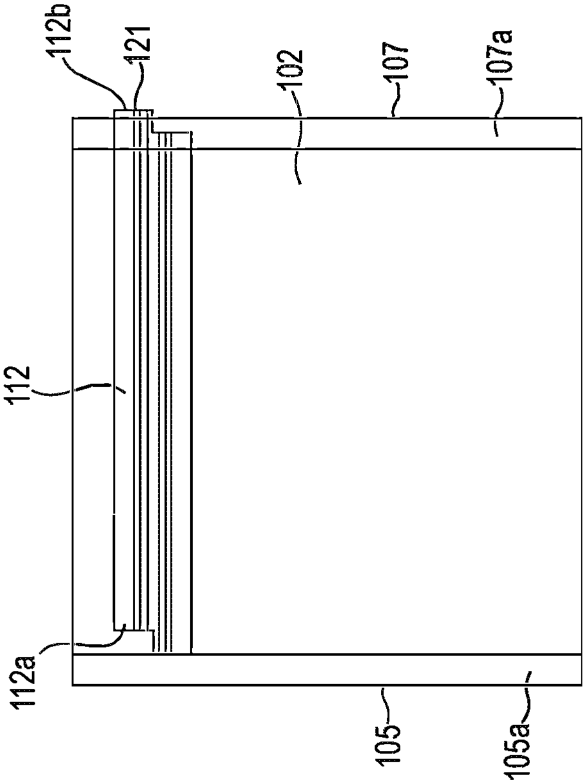
FIG. 52 is a plan view of a film or web of material with a cantilevered locking member applied thereto according to certain embodiments of the invention.

Referring next to FIGS. 52-54, a package formed with the seal configuration of FIG. 49A is shown. On the first end 112*a*, the outer edge region of the first end 112*a* is aligned with the inner boundary of the lap sealing region. The second end 112*b* forms a cantilevered portion 121 by extending past the edge of the film 107. When the lap seal is formed, the cantilevered portion 121 nests with the first end 112*a* to eliminate any gap adjacent the lap seal 120.

The package according to the invention can include packages constructed, in whole or in part, of flexible, rigid, semi-rigid, or semi-flexible materials or panels. Briefly, the package panel portions are generally constructed of flexible sheet material such as polyethylene, polyester, metal foil, polypropylene, or polyethylenes or polypropylenes laminated with other materials such as nylon, polyester, and like films. To provide for increased barrier properties, embodiments can use composite or laminate layers of said materials and materials of the like. Generally, in such composite or laminate embodiments, a material having preferred sealing characteristics can be joined, bonded or laminated to a material having a different preferred characteristic (e.g., beneficial oxygen barrier properties). Regardless, single sheets, composites/laminates, and a myriad of other materials and techniques known to one skilled in the art may be implemented based on particular usage and manufacturing needs without deviating from the spirit and scope of the present invention. The present invention in certain embodiments permits the flexible package to be made using less expensive or cheaper materials than would otherwise be necessary.

The package 100 and its portions can be formed to provide a stand-up pouch, pre-made pouch, bag-top, one formed and filled on a "form-fill-seal" (e.g., vertical, horizontal, etc.) machine, thermoforming machine, and other known package designs and configurations. Other known package designs and packaging techniques and features can be adapted to incorporate or form the configuration of the present invention as well.

Embodiments employing seals can utilize heat seals, adhesive bonding, and various other known sealing techniques. Further, various tearable or removable portions of seals or package portions can include notches, scoring, perforations or the like to facilitate removal.

Various figures and descriptions disclose features and accessories. However, it must be noted that these features are merely illustrative in nature and may be placed in varying locations and under varying configurations and shapes, and still be consistent with the present invention. Various regions of the package can include a handle portion, access devices (e.g., re-closeable zipper devices), and the like. In addition, the shape and configuration for the panel portions are also merely illustrative and can be altered without deviating from the spirit and scope of the present invention. Any of the panel portions, or selected regions thereof, can include various aesthetic and functional graphics, such as logos, instructions, advertising, bar codes, and the like. These graphics can run transverse, parallel, or even in a diagonal orientation to the longitudinal panel edges discussed herein.

The present invention may be embodied in other specific forms without departing from the spirit or essential attributes thereof, and it is, therefore, desired that the present embodiment be considered in all respects as illustrative and not restrictive. Similarly, the above-described methods and techniques for forming the present invention are illustrative processes and are not intended to limit the methods of manufacturing/forming the present invention to those specifically defined herein. A myriad of various unspecified steps and procedures can be performed to create or form the inventive package 100.

What is claimed is:

1. A flexible package comprising:

a film having a right edge, a left edge, a top edge, and a bottom edge;

a closure device coupled with and extending across the film transverse to the right edge and the left edge of the film, the closure device elongated from a first end to an opposite second end; and a bridging material located on the closure device between the first end and the second end of the closure device, the film having a first sealing edge region extending along and adjacent to the right edge of the film, the film also having a second sealing edge region extending along and adjacent to the left edge of the film, the first sealing edge region and the second sealing edge region sealed to each other by a lap seal with the first end and the second end of the closure device separated by an air gap, wherein the bridging material is disposed adjacent the lap seal and between the first end and the second end to serve as a caulking that fills the air gap.

2. The flexible package of claim 1, wherein the second end of the closure device is adjacent to the lap seal.

3. The flexible package of claim 1, wherein the closure device is a resealable zipper closure.

4. The flexible package of claim 1, wherein the first end of the closure device extends partially into the lap seal.

5. The flexible package of claim 4, wherein the first end of the closure device is spaced apart from the right edge of the film and the left edge of the film in the lap seal.

6. The flexible package of claim 4, wherein the first end of the closure device is located halfway into the first sealing edge region.

7. The flexible package of claim 1, wherein the second end of the closure device is located against an inside edge of the lap seal.

8. A flexible package comprising:

a film having opposite edges coupled with each other by a lap seal;

a zipper closure device coupled to an inside surface of the film and configured to repeatedly open and close the flexible package, the zipper closure device including interlockable members connected with an elongated body that extends from a first end to an opposite second end, the first end of the zipper closure device separated from the second end of the zipper closure device by a gap; and a bridging material located on the zipper closure device between the first end and the second end of the zipper closure device, the bridging material disposed adjacent the lap seal and between the first end and the second end of the zipper closure device and filling the gap.

9. The flexible package of claim 8, wherein the first end of the zipper closure device is sealed to the film inside the lap seal and the second end of the zipper closure device is sealed to the film outside the lap seal.

10. The flexible package of claim 8, wherein the second end of the zipper closure device is adjacent to the lap seal.

11. The flexible package of claim 8, wherein the first end of the zipper closure device extends partially into the lap seal.

12. The flexible package of claim 11, wherein the first end of the zipper closure device is spaced apart from the edges of the film in the lap seal.

13. The flexible package of claim 11, wherein the first end of the zipper closure device is located halfway into the lap seal.

14. The flexible package of claim 8, wherein the second end of the zipper closure device is located against an inside edge of the lap seal.

15. A flexible package comprising:

a web of flexible material having opposite left and right edges and opposite top and bottom edges, each of the left and right edges including a seal region extending along the respective left or right edge, the seal regions of the left and right edges coupled with each other by a lap seal;

a zipper closure having an elongated body with interlockable bodies, the elongated body extending from a first end to an opposite second end, the zipper closure sealed to the web between the left edge and the right edge with the first end of the zipper closure sealed to the web and the second end of the zipper closure sealed to the web with a gap between the first end and the second end; and a bridging material located on the zipper closure between the first end and the second end of the zipper closure, the bridging material located adjacent to the lap seal and filling the gap between the first end and the second end of the zipper closure.

16. The flexible package of claim 15, wherein the second end of the zipper closure is adjacent to the lap seal.

17. The flexible package of claim 15, wherein the first end of the zipper closure is spaced apart from the left and right edges of the web in the lap seal.

18. The flexible package of claim 15, wherein the first end of the zipper closure extends halfway into the lap seal.

19. The flexible package of claim 15, wherein the second end of the zipper closure is located against the elongated body of the zipper closure along an edge of the lap seal.

20. The flexible package of claim 15, wherein the bridging material includes a hot melt polymer.

* * * * *